US00RE35056E

United States Patent [19]

Wood et al.

[11] E Patent Number: Re. 35,056

[45] Reissued Date of Patent: Oct. 10, 1995

[54] FOOD SERVICE SYSTEM UTILIZING REFLECTED INFRARED SIGNALS TO IDENTIFY TYPE OF DISH

[75] Inventors: Simon J. Wood; Mark M. Gamble, both of Leicestershire, England

[73] Assignee: Nasram Investments Limited, Isle of Man

[21] Appl. No.: 344,366

[22] Filed: Nov. 23, 1994

[63] Continuation of International PCT Application No. PCT/GB89/01400, filed Nov. 23, 1989.

Related U.S. Patent Documents

Reissue of:

[64] Patent No.: 5,243,171
Issued: Sep. 7, 1993
Appl. No.: 705,003
Filed: May 23, 1991

[30] Foreign Application Priority Data

Nov. 25, 1988 [GB] United Kingdom ..... 8827611

[51] Int. Cl.[6] ..... A47J 39/00; H05B 3/68; A47B 3/02; A47G 23/06

[52] U.S. Cl. ..... 219/386; 219/521; 219/502; 99/331; 165/918; 126/246

[58] Field of Search ..... 219/521, 385–387, 219/518, 502, 214; 99/331, 325, 468; 165/918, 919; 126/246, 268; 312/236

[56] References Cited

U.S. PATENT DOCUMENTS

| | | | |
|---|---|---|---|
| 3,500,742 | 3/1970 | Tanguy et al. | 99/326 |
| 3,842,724 | 10/1974 | Korr et al. | 219/518 |
| 3,974,358 | 8/1976 | Goltsos | 219/387 |
| 4,005,745 | 2/1977 | Colato et al. | 312/236 |
| 4,020,310 | 4/1977 | Souder, Jr. et al. | 164/919 |
| 4,068,115 | 1/1978 | Mack et al. | 219/386 |
| 4,110,587 | 8/1978 | Souder, Jr. et al. | 219/386 |
| 4,203,486 | 5/1980 | Rubbright et al. | 219/386 |
| 4,285,391 | 8/1981 | Bourner | 219/386 |
| 4,584,466 | 4/1986 | de Mola | 219/386 |
| 4,614,441 | 9/1986 | Wolf | 219/502 |
| 4,776,386 | 10/1988 | Meier | 165/918 |
| 4,833,304 | 5/1989 | Ueda | 219/518 |
| 5,093,556 | 3/1992 | Oelfke | 219/386 |
| 5,189,281 | 2/1993 | Wyatt et al. | 219/386 |

FOREIGN PATENT DOCUMENTS

| | | | |
|---|---|---|---|
| 3619762 | 12/1987 | Germany | 99/331 |
| 2131989 | 6/1984 | United Kingdom . | |

*Primary Examiner*—John A. Jeffery
*Attorney, Agent, or Firm*—Christensen, O'Connor, Johnson & Kindness

[57] ABSTRACT

In a food service system, prepared meals including chilled foods are assembled in individual meal trays (10) and held in the trays for a period prior to regeneration to prepare the food for heating. A control system of a rethermalizing trolley (12), which accommodates a large number of trays, can discern for itself which dishes (30) in the trays need heating and which are to remain cool. Dishes for hot and cold foods have white and black markings respectively, which results in reflected infra-red signals from sensors (42, 44) of the control system to be of discernably different strengths, so identifying the hot food dishes. Dish temperature is continually monitored by the control system by means of thermal contact with thermistors (46), which enables the system to oversee food temperatures both prior to and during regeneration.

8 Claims, 6 Drawing Sheets

FOOD SERVICE SYSTEM UTILIZING REFLECTED INFRARED SIGNALS TO IDENTIFY TYPE OF DISH

Matter enclosed in heavy brackets [ ] appears in the original patent but forms no part of this reissue specification; matter printed in italics indicates the additions made by reissue.

*This application is a continuation of prior copending international PCT Application No. PCT/GB89/01400, filed Nov. 23, 1989, the benefit of the filing date which is hereby claimed under 35 U.S.C. §120.*

Food service systems are known, particularly for use in hospitals and other institutions where large numbers of meals have to be prepared and served, which enable complete meal trays to be prepared some time before the meals are wanted, and food in dishes on the trays to be heated up subsequently (in situ on the trays) for serving at the appropriate time. To preserve it during the intervening period, between preparation and serving, the food may be kept suitably cool by refrigeration. Such re-heating of food from a chilled condition to prepare it for serving, is commonly referred to as regeneration or rethermalization. Such systems may also find use in transport catering (e.g. inflight on aircraft) and "meals on wheels" distribution services.

Apparatus for use in one such regeneration system is described for example, in Patent Specification U.S. Pat. No. 4,285,391. That apparatus comprises a rethermalizing trolley which can be stored in a refrigeration cabinet when loaded with meal trays, and wheeled out from the cabinet when the meals are to be served. The trolley comprises a stack of shelves, each adapted to support one meal tray. Each shelf comprises three flat heating elements and food dishes on the meal tray project through openings in the bottom of the tray so as to stand on the elements. At an appropriate time the heating elements are switched on to heat the three dishes of each tray, to regenerate the food in the dishes, and the trolley is afterwards wheeled out from the cabinet for service of the meal trays. The meal trays have insulated covers and the individual dishes can be heated up, within the cabinet, without substantial detriment to the refrigerated environment which maintains other (unheated) dishes cool.

Each meal tray for use in that apparatus (and as in some similar form is generally the case in all such regeneration systems) is formed to provide a plurality of recesses to accommodate, for example, cutlery, condiments, and small dishes, and also three open-bottom compartments in which the dishes for hot food are retained. The three open-bottom compartments are in registry with the heating elements of the trolley shelf in one orientation of the tray on the shelf, but in case there should be no food regeneration needed for a particular tray it is possible for each tray to be shelved in an opposite orientation which results in the heating elements for that shelf not being activated. However, should a tray be suitably inserted for activation of the heating elements then necessarily all three elements of that shelf will operate, even though there may be no dish in one or more of the open-bottom compartments.

A system which affords greater versatility, in allowing for meal trays which require some but not all of the heating elements for a tray to be activated, is described in Patent Specification U.S. Pat. No. 4,005,745. In that system the heating elements of each shelf of the service trolley can be switched on or off individually by an operator, so ensuring that only those heating elements which are actually needed are operated.

Similarly, in the system described in Patent Specification

U.S. Pat. No. 4,203,486 the heating elements can be controlled individually, in that case from a programmed computer control facility.

All three of those known systems so allow, to a greater or lesser degree, for variations in the requirements for heating dishes in the hot food compartments of the trays of a loaded trolley. The second and third systems referred to permit appropriate individual control of all the heating elements, but in all three cases an operator has either to inspect each tray, or be supplied with the relevant information about the make-up of the trays, in order to know the detail of the heating requirements. In the third system, for example, a printed record of the requirements is prepared in order that the rethermalizing control system computer can be programmed.

There is a system described in patent specification U.S. Pat. No. 4,584,466 in which the heating elements can only be activated in the presence of a dish which actually requires heating. This is achieved by providing the heating elements in the bases of the dishes themselves (so requiring specially constructed dishes) and using conductors and dish-engaging contacts in the tray to supply power from support rails to such installed dishes; any dish without a heating element therefore remains unheated, regardless of its position in the tray. Quite apart from such a system requiring a special kind of dish, the supply of large electric currents through readily separable contacts, first from the rails to the tray and then from the tray to the dishes, is likely to give trouble from sparking and furring of the contacts, and is generally an undesirable arrangement.

It is an object of the present invention to provide improved rethermalizing apparatus of the general kind illustrated by the systems referred to.

The invention provides, in one of its aspects, rethermalizing apparatus suitable for use in regenerating chilled food in a food service system in which prepared meals including chilled foods are assembled in individual meal trays and held in the trays for a period prior to regeneration to prepare the food for eating, the apparatus comprising a plurality of individually controllable heating units for heating food as necessary in individual food dishes within a tray, and a control system arranged to operate the heating units selectively so as to heat food requiring regeneration but not to heat food which it is required should remain cool, [characterised] *characterized* in that for effecting operation of those heating units only which are associated with dishes holding food to be heated the control system is arranged to reflect radiated sensing signals off the dishes and to respond to the reflected signals, the use of food dishes which are suitably distinctive as between hot food dishes for holding food which is to be heated and cold food dishes for holding food which is to remain unheated enabling the control system to distinguish between the hot and cold food dishes from differences in the reflected signals.

The sensing signals may be infra-red radiation and, in a simple form, dishes for containing food to be heated may be white or marked suitably with a white patch, and dishes which are to remain unheated black or marked with a black patch, so that the reflected signals are of discernably different strengths as between different categories of dish. A sensor unit comprising an emitter and a detector can conveniently be located adjacent to a dish positioned for heating in order to reflect a signal off the dish and to pass an indication of the strength of the reflected signal to the control system which so discerns whether or not the food in that dish is to be heated. The invention provides, in another of its aspects, rethermalizing apparatus suitable for use in regenerating chilled food in a food service system in which prepared meals including chilled foods are assembled in individual meal trays and held in the trays for a period prior to regeneration to prepare the food for eating, the apparatus comprising a plurality of individually controllable heating units for heating food as necessary in individual food dishes within a tray, and a control system arranged to operate the heating units selectively so as to heat food requiring regeneration but not to heat food which it is required should remain cool, [characterised] *characterized* in that the control system comprises means whereby the temperature of food in the dishes in a tray can be monitored prior to and during regeneration.

The temperature of the food may conveniently be monitored indirectly by monitoring the temperature of dishes holding the food in the trays. In a convenient arrangement, a sensor unit comprising a thermistor or other temperature-responsive electrical element is located adjacent to a dish positioned for heating in order to be responsive to changes in the temperature of the dish and to pass a corresponding signal to the control system.

Monitoring the food temperature can be of advantage both in ensuring that the food is kept under appropriate temperature conditions prior to regeneration, and in controlling the regeneration process for suitable treatment of the food and energy conservation.

There now follows a detailed description, to be read with reference to the accompanying drawings, of a food service system which illustrates the invention by way of example.

In a food service system, for example for distributing large numbers of pre-prepared meals to the patients in a hospital, use is made of covered meal trays 10 in which complete meals can be arranged for service and held for a time prior to eating, and rethermalizing trolleys 12 in which the trays can be stacked and by means of which chilled food in the trays can be regenerated at the required time.

Figure 2:
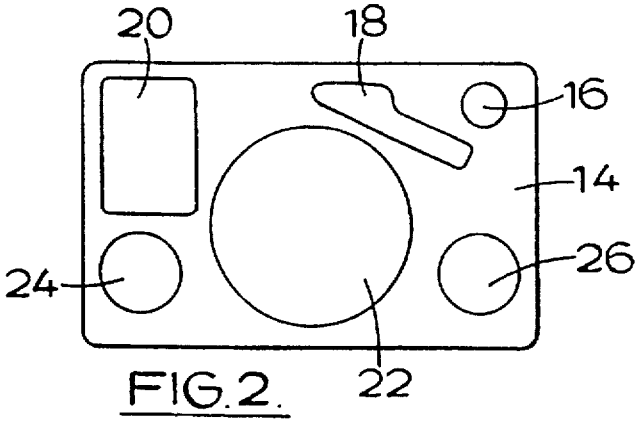
FIG. 2 is a diagrammatic plan of compartments of a meal tray.
Figure 3:
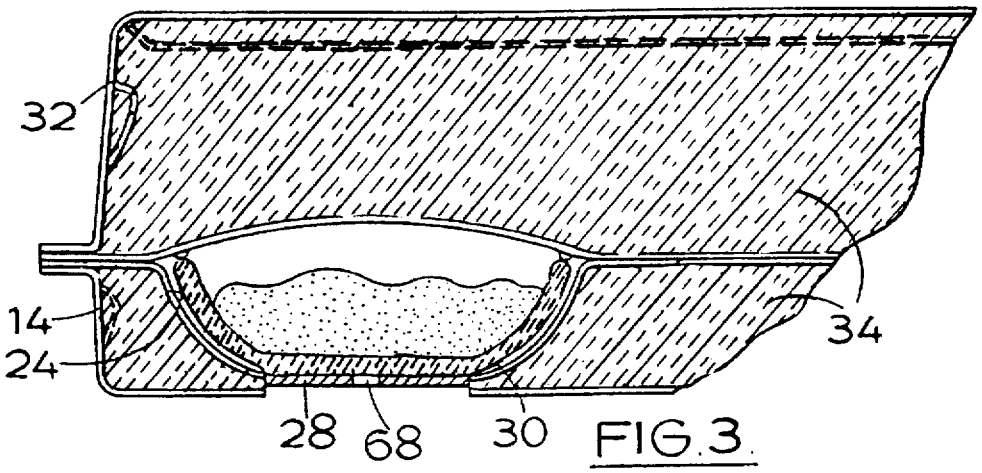
FIG. 3 is a view in [cross-section] *cross section* through part of a meal tray, showing a hot food dish in position in the tray.

Meals may be prepared in a single central kitchen where also the individual meal trays 10 are made up in accordance with menu selections made by the patients. As illustrated by FIGS. 2 and 3, a lower deck 14 of each meal tray provides an assortment of recesses 16, 18 and 20 for accommodating, respectively, a drinking vessel, cutlery, and a side dish or plate (for, perhaps, bread and/or butter, cheese etc.). Also provided are three heating compartments 22, 24 and 26 in which dishes can be placed for food that may need regenerating after chilling; as illustrated, the compartment 22 would be to hold a main meal dish or plate, and the compartments 24 and 26 could be for soup and hot pudding, respectively. However, as will become apparent hereinafter, dishes can be placed in any of the heating compartments 22, 24 and 26 with food that is not to be hated up before eating, without any disadvantage; for example, there may be a hot main course dish in compartment 22 and a dish for a pudding to be eaten cold in compartment 26.

As can be seen from FIG. 3, each of the heating compartments 22, 24 and 26 (only compartment 24 is shown) has a bottom wall formed by an aluminium heat transfer plate 28 which is retained in an opening through the bottom of the lower deck 14 of the tray. The transfer plate 28 is in the form of a flat disc on which a food dish 30 stands when lodged in the compartment 24. The bottom surface of the transfer plate 28 is slightly above the surrounding bottom surface of the tray, a slight recess so being provided in the tray bottom beneath the plate.

Each meal tray comprises also an upper deck 32 which provides a cover for the loaded lower deck 14, and each of the two decks of the tray is filled with a thermally insulating polyurethane foam filling 34 in order to help maintain chilled food in the tray at a suitably low temperature for safe storage prior to being regenerated for eating.

Alternatively, at least the lower deck 14 of the tray may be filled with a so-called "eutectic" liquid, the tray being frozen before loading and enabling food to be kept for up to twenty-four hours in the tray prior to regeneration.

The prepared meal trays, with foods that require it being chilled in their dishes in the trays, are stacked on shelves 36 of the service trolley 12. In the trolley illustrated in FIG. 1, there are eight shelves accessible from each of opposite sides of the trolley and each shelf can accommodate two trays side-by-side; the trolley therefore carries, when full, thirty-two meal trays.

In the upper surface of each shelf 36 there are six flat, disc-like, [aluminium] *aluminum* heating plates 38 which correspond in size and position with the heat transfer plates 28 of two trays 10 installed on the shelf. The heating plates 38 are raised slightly above the upper surface of the shelf in order to locate in the similar recesses in the bottoms of the trays, beneath the transfer plates 28; the parallel heating plates 38 and heat transfer plates 28 are so arranged to abut face-to-face. Electric heating elements 39 (FIGS. 5 and 8) are arranged in a conventional manner for heating the heating plates 38, and so the heat transfer plates 28 and the food dishes 30 standing on them in the trays 10.

Operation of selected heating elements at required times is controlled automatically by an electronic control system of the trolley which includes a microprocessor. In order that the control system can know which heating elements are required to be operated and can continually monitor the temperatures of the food dishes in the trays, the system includes sensor units 40 fitted into the heating plates 38.

Figure 1:
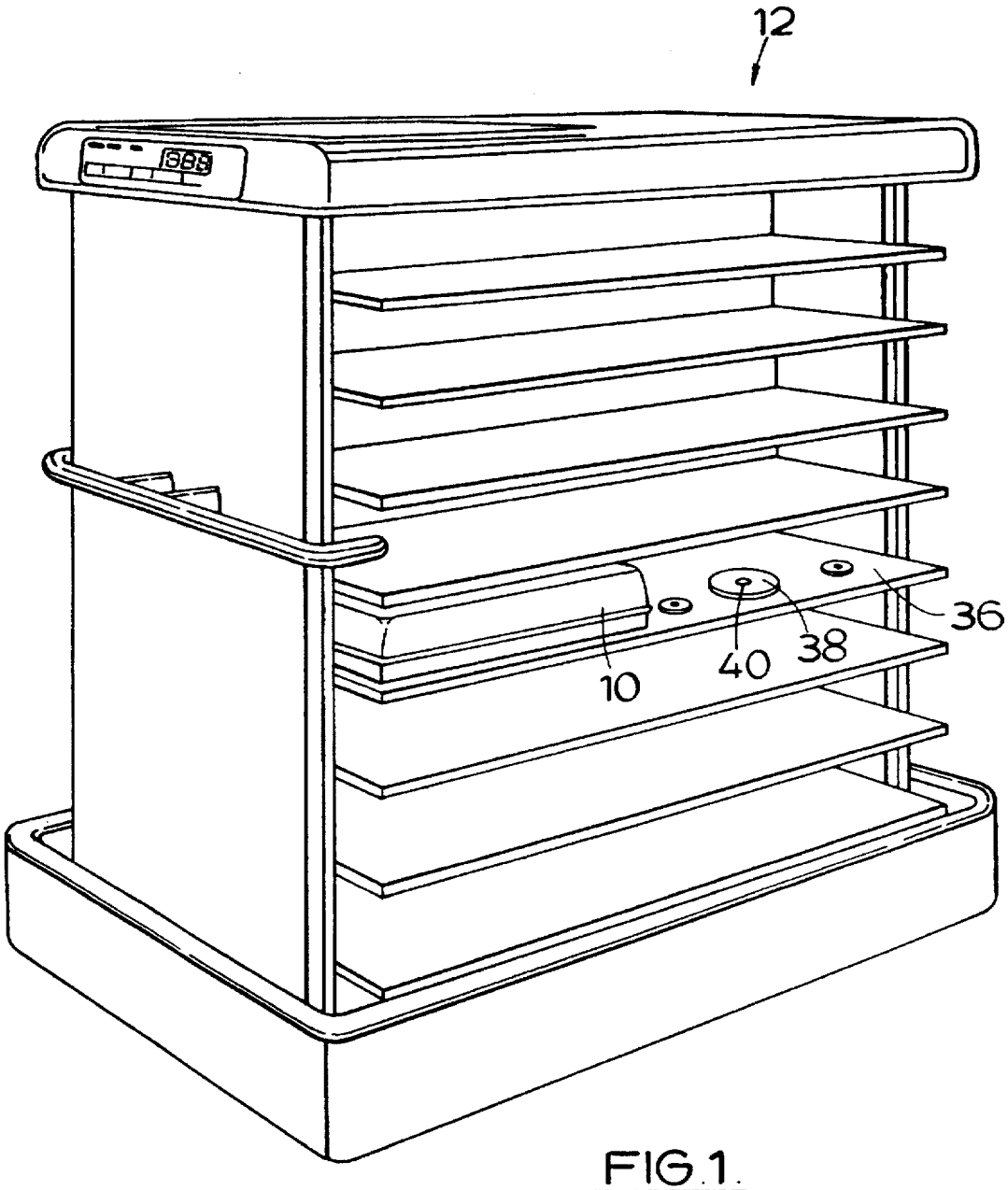
FIG. 1 is an overall view in perspective of a rethermalizing trolley with one of a plurality of meal trays shown installed on a shelf of the trolley.

As indicated by FIG. 1 (which shows only the heating plates for one shelf, but all the shelves are in fact the same) each heating plate 38 has an opening at its centre into which its associated sensor unit 40 is fitted. A flat top surface of the sensor unit is flush with the upper surface of the heating plate.

Figure 4:
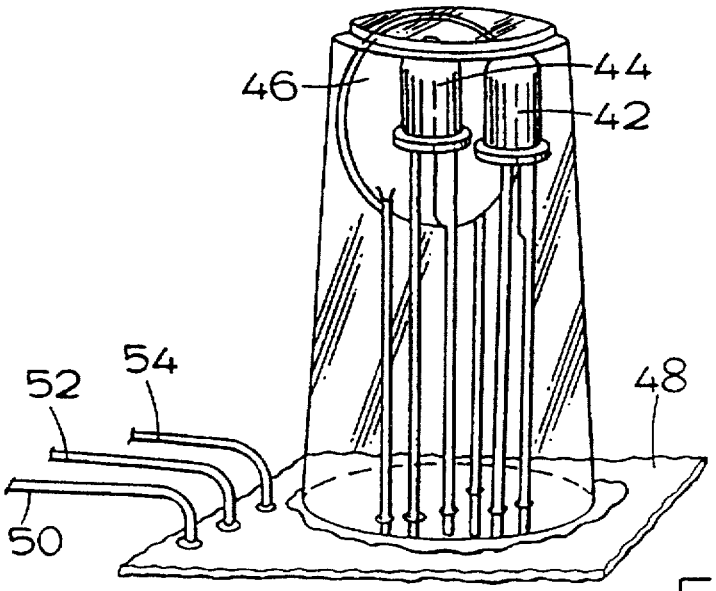
FIG. 4 shows one sensor unit of a kind utilized in connection with each of a plurality of heating elements of the trolley.

Each sensor unit 40 (FIG. 4) comprises an infra-red emitter 42, an infra-red detector 44 and a thermistor 46, the three components being mounted on a printed circuit board 48 and potted together in a clear casting resin. An uppermost edge of the thermistor 46 is coincident with the top surface of the sensor unit so as to engage the undersurface of the associated heat transfer plate 28 of an installed tray; the thermistor is so installed to be electrically responsive to variations in the temperature of the transfer plate 28. The three components 42, 44 and 46 of the unit are electrically interconnected by the printed circuit board 48 and three leads 50, 52 and 54 from the board provide for common ground, input and output connections respectively.

Figure 5:
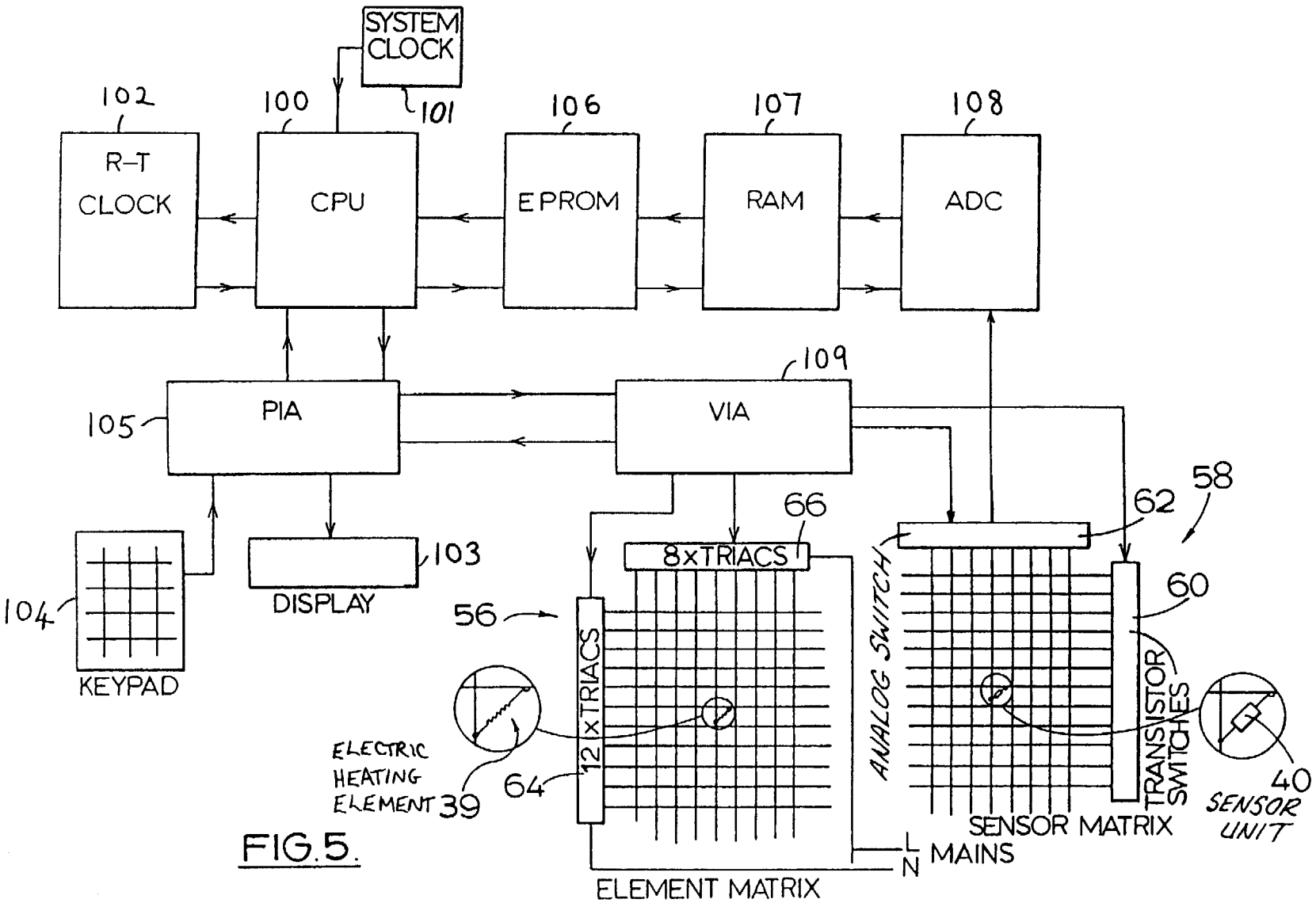
FIG. 5 is a schematic circuit diagram of control circuitry of the trolley.

With reference to FIG. 5, the control system comprises in addition to the microprocessor 100 (CPU) and system clock 101, a real-me (R.T.) clock 102 which enables the system to keep track of the time of day. A digital display 103 and keypad 104, communicating with the microprocessor through an interfacing chip 105 forming a peripheral interface adapter (PIA), enable communication between the microprocessor and an operator. Memory capacity is provided through EPROM 106 and RAM 107 facilities. An analog to digital converter 108 (ADC) enables voltage signals from the sensor units 40 to be read by the CPU. A second interfacing chip 109 forming a versatile interface adaptor (VIA) links the CPU to two wiring matrices 56 and 58 for control of the heating elements and the sensor units 40, respectively.

The matrices 56 and 58 enable the ninety-six heating elements and the ninety-six sensor units (there being six of each on each of sixteen shelves) to be controlled individually. Each matrix is an 8×12 arrangement of twenty distinct conductive paths considered in columns and rows, each heating element or sensor unit being connected across a unique combination of column and row paths for individual control.

Considering the sensor units 40 in the matrix 58 first, the twelve row paths lead from a transistor switching device 60 and the eight column paths lead to an analogue switching device 62, both of which devices are under the control of the VIA chip. Output signals from the analog switching device 62 are passed to the ADC for conversion and onward transmission to the CPU.

Considering the heating elements in the matrix 56, the twelve row paths lead from a bank 64 of twelve triacs and the eight column paths lead to a bank 66 of eight triacs, both banks of triacs being under the control of the VIA chip. Mains voltage is applied to [energise] *energize* the heating elements, but to prevent mains voltage reaching the CPU, the triacs are not directly connected but are isolated optically from the main circuitry by optotriacs. To increase heating element life and reduce interference, the elements are switched on and off only when the mains voltage cycle is at zero. The total loading of all the heating elements of the trolley would be 288 kw, but by using a pulsed power-sharing technique the trolley is enabled to operate from an ordinary 13 amp 3 kw power supply. The sensor units 40 serve two purposes. As hereinbefore referred to, through use of the thermistors 46 they are adapted to signal variations in temperature of the heat transfer plates 28 and so (indirectly) to monitor food temperature. However, they further have an essential role in identifying which dishes require heating and which do not when the time comes for regeneration. This latter function is effected through use of the infrared emitter 42 and detector 44 of each unit.

Each heat transfer plate 28 has in it a small aperture 68 (FIG. 3) which is so aligned with the sensor unit 40 of the associated heating plate 38, when the tray is installed on a trolley shelf 36, that it forms a window above the infra-red elements 42 and 44 of the unit. The sensor unit 40 can so "view" the bottom of any food dish 30 in the heating compartment 24 of the tray by reflecting an infra-red signal off the dish by means of its infra-red elements 42 and 44. [The thermistor 46 is positioned aside from the window 68, so as still to engage the underside of the heat transfer plate 28.] Each of the food dishes 30 used in the compartments 24 of the tray is identified as one to be heated or not, as the case may be, by means of a white or a black (respectively) identifying patch on its bottom surface opposite the window 68. The reflected signal which the infra-red detector 44 of an activated sensor unit receives from a dish with a white marking is of a markedly different level from that which would be received from a dish with a black marking (or similarly in the absence of a dish from the compartment) and the output signal from the sensor unit 40 as a whole is consequently of a quite different order in the two cases. Accordingly, provided that in preparation of the meal trays dishes with white markings are used to contain those foods which need to be regenerated, and dishes with black markings to contain those foods which do not, the control system is able to determine automatically which heating elements need to be operated by distinguishing between the two levels of signals being produced by the sensor units 40.

Power for the control system comes principally from an internal rechargeable battery, mains power being required only for the heating elements during food regeneration, during which time the battery can also be recharged.

The system is under the control of a program stored in the EPROM, which program can be changed to vary or update the system when required, for example to meet statutory regulations for the safe storage, handling and regeneration of chilled meals. When the system is first powered up, the program sets all the hardware to a predetermined set of conditions. Once this is done the program stays in a loop constantly reading the keypad to check for any input by the operator, and checking whether the time has been reached for regeneration; if an input is detected the program will branch off from the main loop to perform the required task.

Every two minutes the program jumps out of the main loop in order to activate and read the sensors 40 (one by one) and so monitor the arrangement of food dishes 30 and their temperatures. This information is recorded by the CPU in the memory. The CPU is thereafter able to detect any change in the arrangement and temperature of the food dishes by comparing the new information each time with that previously recorded. One minute before it is time to regenerate, the program branches off to make a last check of the food dishes prior to regeneration, and if all is satisfactory the program then branches off into a regeneration routine.

Continual monitoring of the food dish temperatures prior to regeneration can be important, as it may be essential that the temperature of chilled food held in the trays does not rise above, say, 10° C. Should the control system detect that such a rise in temperature has occurred it will cause an alarm signal to be given together with an indication to the operator as to which dish is affected.

During the regeneration routine, the system continually activates each of the required heating elements in turn, also continually monitoring the temperatures of the dishes. Towards the end of the routine, the heating elements associated with dishes which have already reached their required temperature are activated by the control system only as much as may be required to maintain that temperature.

This food service system so takes account of varying loads of meal components to enable the system to use a minimum of energy during regeneration. Regardless of the type of food being regenerated the final temperature of all the heated food compartments will be substantially the same.

Instead of individual programming of trolleys by keypads on each, collective programming by an infrared or other transmitter could of course be employed.

Figure 6:
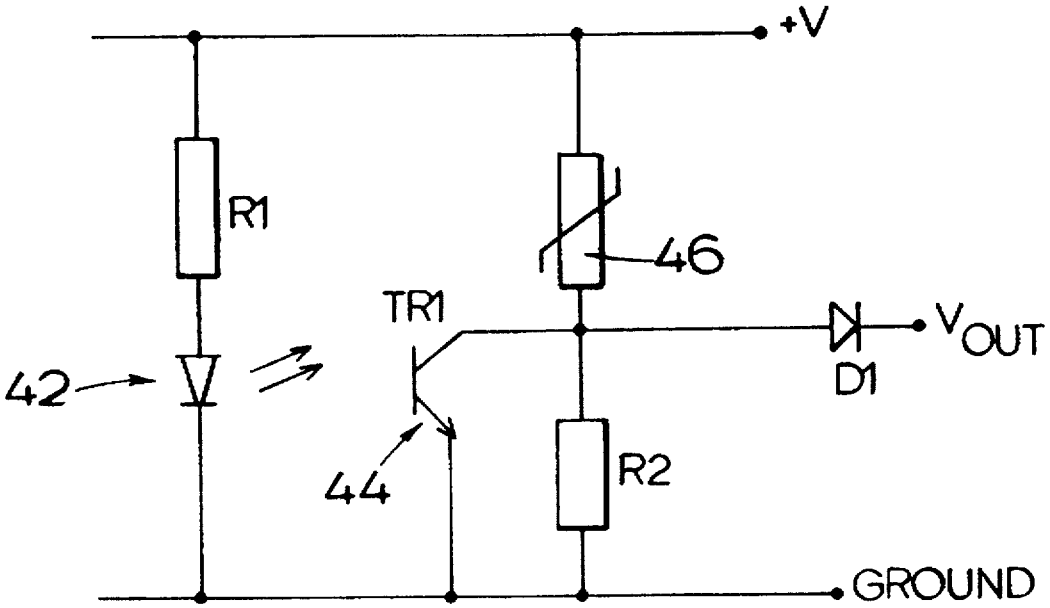
FIG. 6 is a sensor unit circuit diagram.

Further discussion of the operation of the sensor units now follows. FIG. 6 is a circuit diagram for a single sensor unit, which may be considered as two variable resistors forming a potential divider, the two variable resistors being formed by the infra-red detector 44 and the thermistor 46. As a whole unit, the sensor can be considered as a device that produces an output voltage that is related to its temperature and position relative to a reflective surface, i.e. the bottom surface of the dish 30.

The diode D1 is included to prevent the interaction of other sensors in the matrix, by causing the signals to flow in one direction only.

Figure 7:
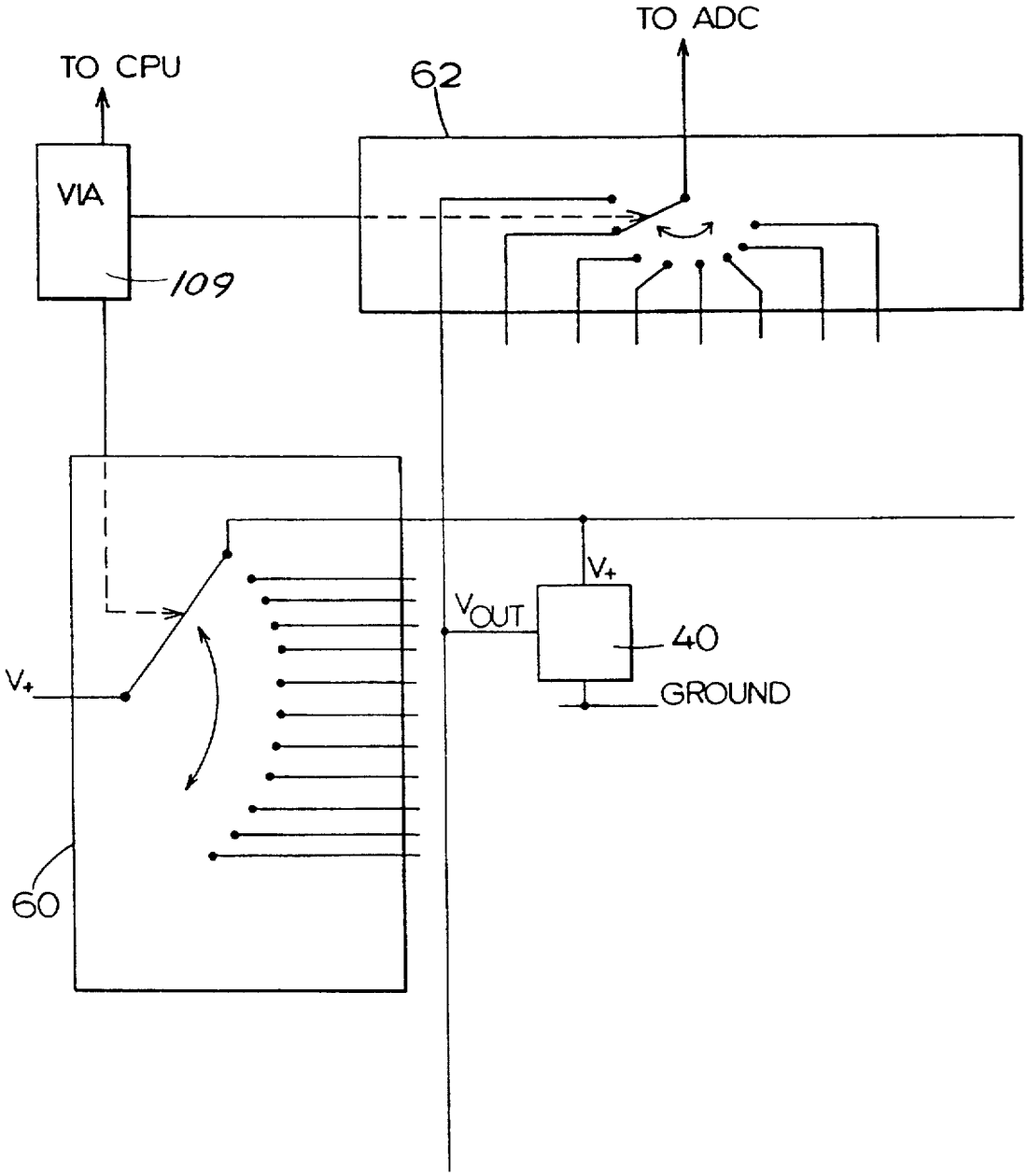
FIG. 7 is a schematic illustration of a sensor matrix switching arrangement.

As hereinbefore described and shown also in FIG. 7, the sensor units 40 are connected so as to form a matrix. The matrix consists of twelve power supply lines (the row paths) each one being controlled by the transistor switching device 60, and eight signal lines (the column paths) connected to the analog switching device 62. The analog switch routes the signal on one of the eight signal lines to the analog to digital converter (ADC). Exactly which signal line is selected depends on a binary number from 0–7 being sent to the analog switch by the CPU.

In order for the value of a particular sensor unit to be read, the CPU must first switch on the transistor that powers the sensor unit in question through the corresponding power supply line, and then send the required binary value to the analog switch to connect the output signal from the sensor unit, on the corresponding signal line, to the analog to digital converter; although there are eleven other sensor outputs connected to this signal line, they are all switched off leaving only the signal from the sensor unit in question to be present. These two operations actually happen simultaneously with the CPU sending a single binary value to the VIA that controls the sensor matrix.

It can be seen from this that only one sensor may be read at a time. To increase the accuracy, each sensor is actually read sixty-four times and an average taken.

The output from each sensor unit 40, once read by the CPU, is a numerical value between 0 and 255. This value is a representation of the type and temperature of the dish 30 with which the sensor is associated.

Initially, before the trolley is loaded, all sensor units will return a low value (e.g. 20) there being slight variations between the ninety-six readings. Any value very different from the rest would indicate that a problem exists, an object obscuring the sensor for example, and a warning buzzer would be sounded to alert the operator.

Once the trolley is loaded and the sensors have been read, all the values should have dropped due to the lower temperature of the dishes, whether requiring heating or not, or remained the same if no plate is present; sensor units associated with dishes that require heating, having white patches viewed by the sensor units, will return a value rather lower than those that are to remain cold (i.e. those having black patches). Any rise in value (i.e. when the trolley is first loaded) would indicate a plate of too high a temperature, the operator being warned should this be the ease.

Subsequent readings, between the times of loading and regeneration, will show a gradual increase in values as the temperature of the food on the dishes rises towards the ambient temperature, this being slowed by the insulated tray. A wildly different value from the rest would point towards a problem with the tray, such as an improperly located lid reducing the amount of insulation and causing the greater increase in temperature.

From the readings before the trolley was loaded the CPU is able to calculate a value that corresponds to the 10° C. limit that the food must remain below before regeneration. Each sensor reading is compared with this value and warning given should any exceed it.

During regeneration the readings will rise fairly rapidly with the food temperature. Readings are now compared with another predetermined value that indicates the 70° C. that the food must reach to be properly regenerated.

The CPU is able to differentiate between food products of greatly different heat capacities by their temperature readings during regeneration, and regulates the amount of heating given to each dish accordingly in order to complete the regeneration of all the meals at the same time. However, in practice most food products require the same amount of heating and little such intervention by the CPU generally occurs.

Figure 8:
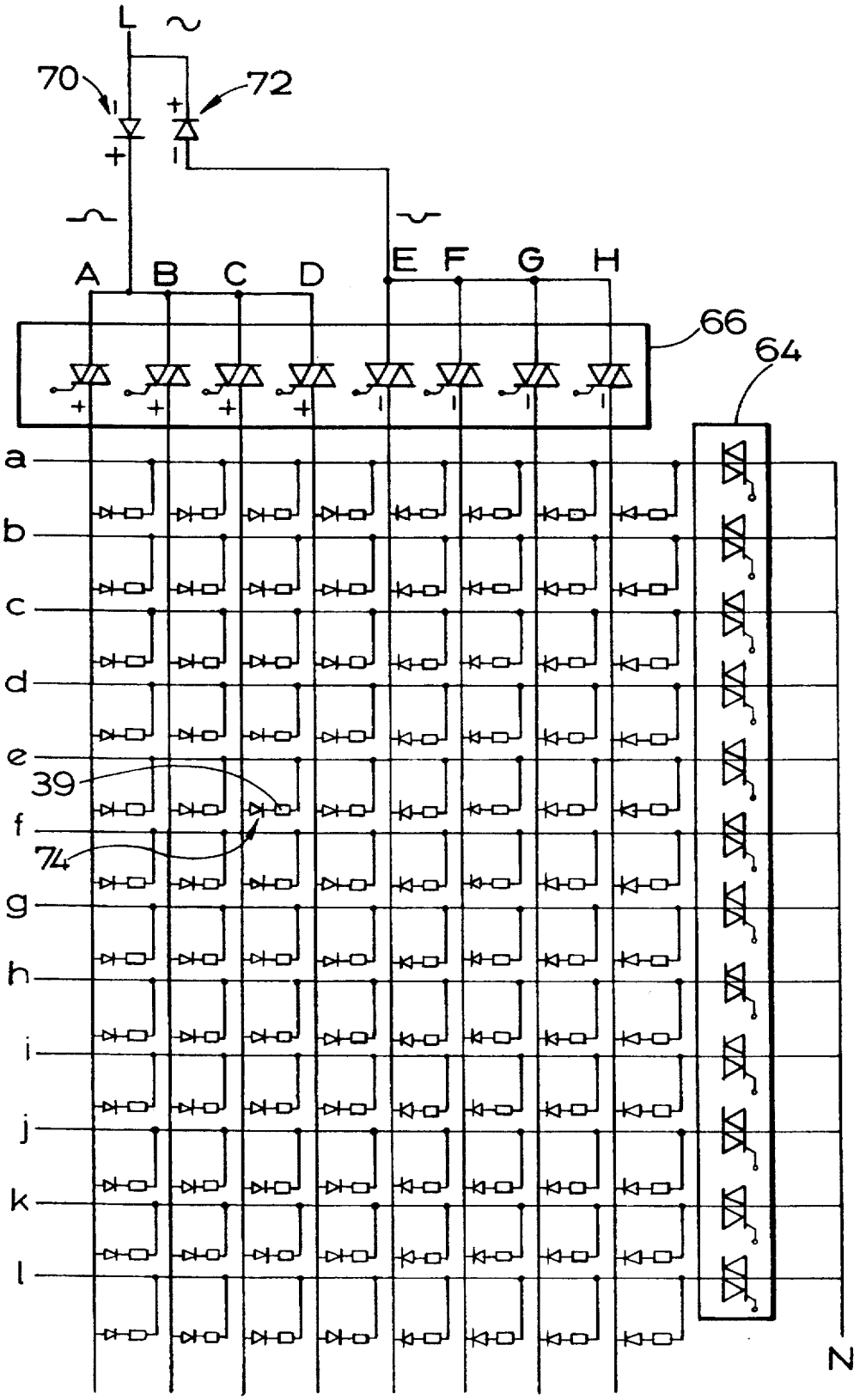
FIG. 8 is a circuit diagram showing in more detail a matrix used to control individual operation of heating elements from a common a.c. power source.

A more detailed description now follows, with reference to FIG. 8, of the control matrix 56 for the heating elements 39.

The twelve row paths a to 1 lead to the bank 64 of twelve triacs and the eight column paths A to H lead from the bank 66 of eight triacs. Mains s.c. voltage is applied to the matrix through the triac banks. The particular heating element 39 indicated in the drawing will, for example, be activated only by the matrix combination Ce.

Whilst by means of such a matrix, a primary conductive path through a single element is created by any selected combination of single column and row paths, a plurality of secondary conductive paths are potentially created through combinations of elements in series. This would result in power wastage, and some heating of elements which are intended to remain inactive, unless measures are taken to block all such secondary paths.

By means of a pair of oppositely orientated diodes 70 and 72 at the a.c. input of the triac bank 66 at the head of the column paths A to H, the mains current is split into its negative and positive components. One component supplies the four paths A to D and the other component supplies the paths E to H. Each of the transfer paths, between a row and column, includes a diode 74 which is orientated appropriately to match the polarity of the column path to which it is connected. All twelve of the transfer paths connected to each of the columns A to H are therefore unidirectional in the same sense. Since the creation of a secondary conductive path requires one of two transfer paths connected to the same column path, and one of two transfer paths connected to the same row path, to be a reverse current path, blocking of all such secondary paths is achieved.

We claim:

1. For use in a food service system in which prepared meals including chilled foods are assembled in individual meal trays and held in the trays for a period prior to regeneration in the trays to prepare the food for eating, rethermalizing apparatus comprising:

(i) a meal tray forming a plurality of compartments in which removable food dishes can be located;

(ii) dish-heating means comprising a plurality of heating units which for effecting thermalization are positioned beneath food dishes in said compartments in said tray and are independently operable for selective heating or non-heating of said dishes as required;

(iii) food dishes of a first type (hot food dishes) which can be located in said compartments in said tray to hold food which is to be heated;

(iv) food dishes of a second type (cold food dishes) which can be located in said compartments in said tray to hold food which is to remain unheated;

(v) heating control means operative to activate said heating units selectively so as to heat any hot food dish located thereover in said tray but not to heat any cold food dish located thereover;

said control means comprising a plurality of sensor units which are associated one with each of said heating units to reflect radiated sensing signals off dishes in said compartments in said tray and to respond to the reflected signals, said hot food dishes and said cold food dishes being distinctive as to the signals caused to be reflected from them whereby enabling the control means to distinguish between them for operation of those heating units alone positioned beneath hot food dishes.

2. Apparatus according to claim 1 characterized in that the sensing signals are of infra-red radiation.

3. Apparatus according to claim 1 characterized in that it comprises a rethermalizing trolley having a plurality of shelves on which trays can be lodged, each shelf comprising a plurality of heating units which are arranged to be in registry with the dishes in a tray installed on the shelf in order to heat those dishes if required.

4. Apparatus according to claim 1 in which said heating units comprise thermally conductive heating plates and electric heating elements for heating the plates.

5. Apparatus according to claim 4 in which there are openings in said heating plates for said sensor units to reflect sensing signals off dishes thereabove.

6. Apparatus according to claim 5 in which said sensor units are mounted in said openings within said heating plates.

7. Apparatus according to claim 5 in which each sensor unit comprises an infra-red emitter and an infrared detector which are potted together in a casting resin and mounted within said opening.

8. Apparatus according to claim 7 in which each sensor unit comprises also a thermistor which is potted together with said emitter and said detector, an uppermost edge of said thermistor being coincident with a top surface of the unit and said top surface being flush with an upper surface of said heating plate.

* * * * *